J. H. MORGAN.
METHOD OF AND MEANS FOR FORMING ARTICLES OF PLASTIC MATERIAL.
APPLICATION FILED MAR. 15, 1920.

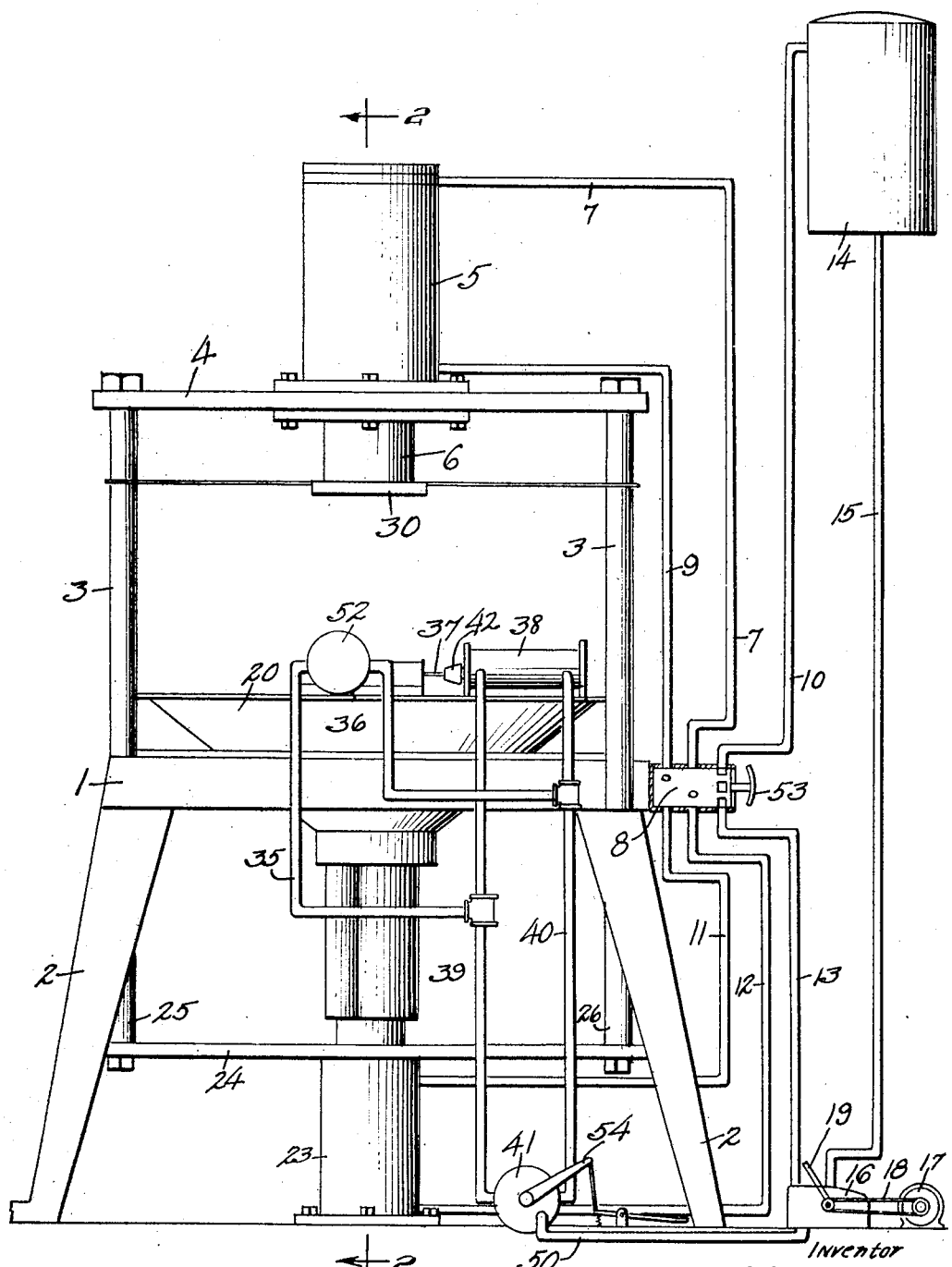

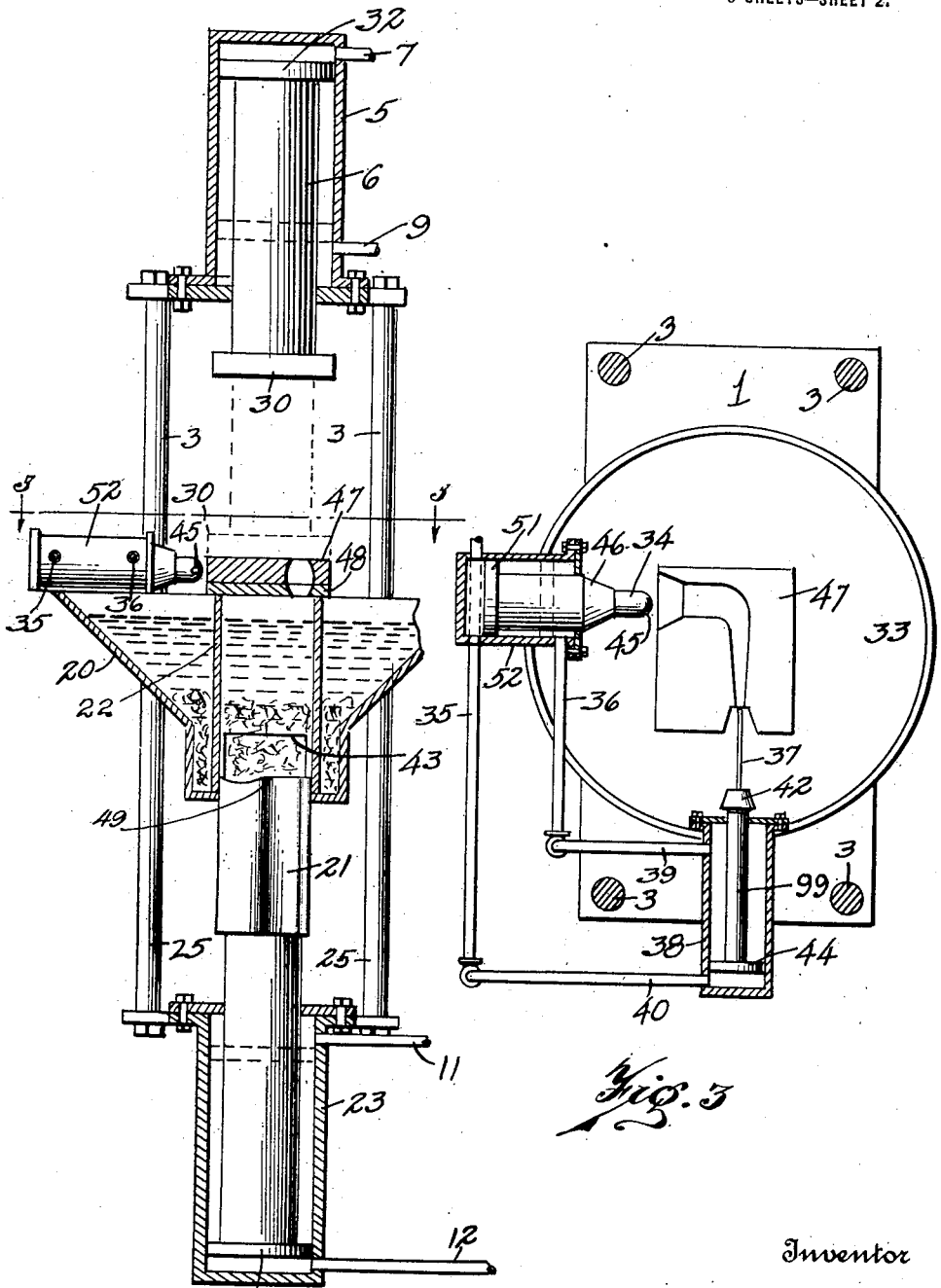

1,376,564.

Patented May 3, 1921.

Inventor
John H. Morgan
By
Emms B. Wisner
Attorney

UNITED STATES PATENT OFFICE.

JOHN H. MORGAN, OF DETROIT, MICHIGAN.

METHOD OF AND MEANS FOR FORMING ARTICLES OF PLASTIC MATERIAL.

1,376,564. Specification of Letters Patent. Patented May 3, 1921.

Application filed March 15, 1920. Serial No. 365,758.

*To all whom it may concern:*

Be it known that I, JOHN H. MORGAN, a citizen of the United States, residing at Detroit, county of Wayne, State of Michigan, have invented a certain new and useful Improvement in Methods of and Means for Forming Articles of Plastic Material, and declare the following to be a full, clear, and exact description of the same, such as will enable others skilled in the art to which it pertains to make and use the same, reference being had to the accompanying drawings, which form a part of this specification.

This invention relates to a method of forming articles of plastic material and the object of the invention is to provide a means of pressing the plastic material such as an asbestos and cement mixture or other mixtures of like character in which a quantity of water, or other fluid is used. This is done by what I call the intensifier method, that is, a mass to be pressed is forced up into an intensifying chamber by a plunger or piston shaped to conform to one side of the article to be formed, the said material being forced into a cylinder together with a quantity of water, or other fluid and the cylinder being shaped to receive the plunger. The mold is formed of several parts and when the piston begins to exert pressure on the water in which the plastic material is contained a predetermined amount of the material is forced into the mold. Under this increased pressure the water begins to seep through the interstices provided between the several parts of the mold and the plastic material is in this manner carried into the mold and the plastic material being heavier than water is retained therein, the mold leaking water only and retaining the plastic mass. By thus pressing the plastic material, the material is pressed to a greater density throughout and is of the same density in the center as at the edges. Heretofore in pressing plastic material by applying mechanical pressure such as a plunger or the like, the plastic material is made very dense at the outside and is of decreasing density toward the center thereof. These objects and the several novel features of the invention are hereinafter more fully described and claimed and the preferred form of construction by which these objects are attained is shown in the accompanying drawings in which:

Figure 1 is a front elevation of the machine.

Fig. 2 is a section taken on line 2—2 of Fig. 1.

Fig. 3 is a section taken on line 3—3 of Fig. 2.

Figure 5:
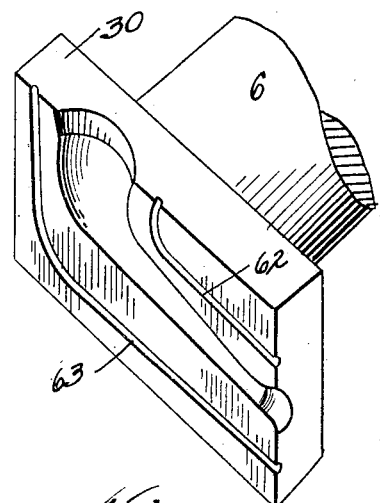
Fig. 5 is a perspective view of the portion of the mold which finishes the upper face of the article to be formed.
Figure 4:
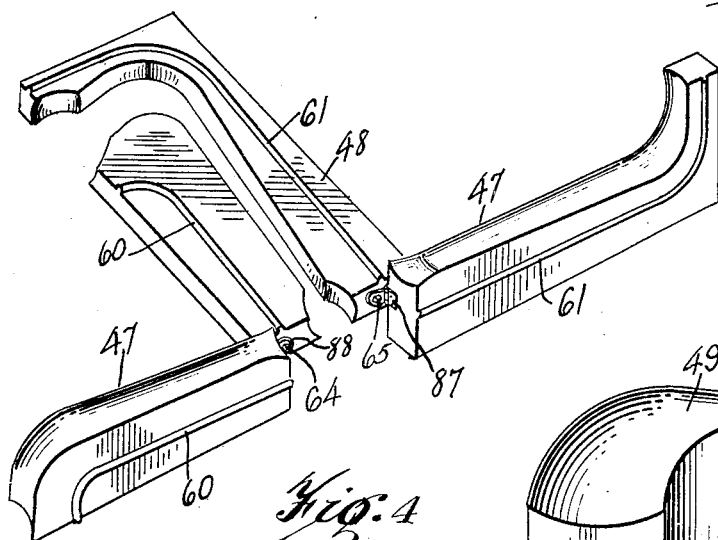
Fig. 4 is a perspective view of the central hinged portions of the mold.
Figure 6:
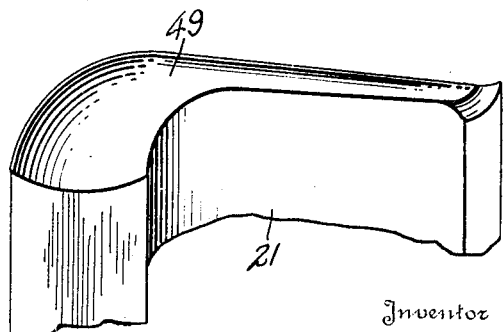
Fig. 6 is a perspective view of the upper end of the plunger by which the lower face of the article is formed.

The device consists of a supporting framework 1 which in turn is supported on the legs 2. The framework 1 is provided with upwardly extending members 3 which support the top 4 on which is supported a cylinder 5 for the piston plunger 6. Connected to the upper end of the cylinder 5 is a tube or pipe 7 which leads to a puppet valve 8 by which the pressure of the fluid may be directed into any one of the pipes 7, 9, 10, 11, 12 or 13. The pipe 10 leads to a surge tank 14 which is connected by a pipe 15 to a fluid pump 16 which in turn is connected to the valve 8 by means of the pipe 13. A motor 17 is provided which by means of the belt 18 operates the pump 16, and a handle 19 is provided on the pump to operate a suitable friction clutch to provide driving power for the pump 16. Mounted in the framework 1 is a hopper 20 adapted to contain an amount of plastic material and a quantity of water and as shown in Fig. 2, the hopper 20 is provided with a plunger 21 which may be reciprocated through the bottom of the hopper and through a cylinder 22 provided in the hopper and formed to allow the plunger 21 to fit therein. The plunger 21 is mounted within the cylinder 23 which is secured to a bar 24 mounted on the rods 25 and 26 and the plunger 21 terminates in a piston head 27 fitting the cylinder 23. As will be noted from Fig. 1, the pipes 11 and 12 are connected to the upper and lower ends of the cylinder 23 which are in turn connected to the valve 8. A mold is secured at the upper end of the cylinder 22 formed of two parts 47 and 48, the said parts having an opening cut therethrough in the shape of the article to be formed which in this case is shown to be a smoking pipe. The form 30 for the outer side of this bowl is carried by the plunger 6, as shown in Fig. 2, which has a head 32 fitting the cylinder 5, the shape of the pipe being cut into the member 30 so as to form the top part of the mold when fitting over the mold block 47. The upper end of the plunger 21 is also hollowed out to form the under side of the pipe mold when fitting against the mold block 48. As is shown in Fig. 3 on the top 33 of the hopper is mounted a bowl core 34 to which are connected the pipes 35 and 36 connected to the pipes 39 and 40 extending from the valve 41 respectively. Also mounted on this top 33 is a piercing core 37 which is carried within a cylinder 38 and to which are connected the pipes 39 and 40 which are connected to the valve 41 respectively. This piercing core is provided with a head 42 which is cupped out to form the enlarged end of the pipe stem and is beveled on the sides to fit the bevel in the mold. The piercing core 37 is also provided with a plunger 99 which is provided with a head 44 fitting the cylinder 38, the pipes 39 and 40 being connected to the opposite ends of the cylinder 38 and the plunger core 34 being notched at 45 to receive the end of the piercing core 37 when positioned in the mold. It will be noted that the bowl core is provided with a beveled face 46 adapted to fit a similar bevel in the mold. The mold which is shown more particularly in Figs. 5, and 6, consists of four parts, the mold block 48 which is secured at the upper end of the cylinder 22, a mold block 47 which is split in two parts and hinged to the block 48, a mold block 30 which is mounted on the plunger 6 and adapted to be moved into engagement with the upper face of the block 47 and a plunger 21 which is adapted to be moved into engagement with the lower face of the block 48. On the upper face of blocks 48 and 47 are beads 60 and 61 and on the under faces of the blocks 47 and 30 are grooves 62 and 63 which engage the beads 60 and 61 and hold the mold blocks from displacement when assembled together. As will be noted more particularly by Fig. 4 the form of the article to be molded is cut through both blocks 47 and 48 and the two hinged parts of the block 47 are pivoted on the block 48 at 64 and 65. The face 49 of the plunger 21 is hollowed to form one side of the pipe and the block 30 is cut to form the other side of the pipe, the mold blocks when assembled together forming the entire pipe form.

In operation the device is set up as shown in Figs. 1 and 2 and by operation of the motor 17 the pump 16 is set in operation which pumps fluid under pressure through the pipe 50 to the valve 41 which in the position shown allows the fluid to pass through the pipe 40 and between the piston 44 and end of the cylinder 38 and between the piston 51 and end of the cylinder 52. The pressure thus created between the cylinder and piston heads forces the bowl core into the bowl portion of the pipe mold and also forces the piercing core into the stem portion of the pipe mold, the piercing core 37 engaging the notch 45 in the bowl core 34. By operation of the handle 53 of the valve 8 the fluid is passed from the motor 16 through the pipe 13 and the valve 8 and through the pipe 7 between the piston 32 and the end of the cylinder 5, as shown in Fig. 2, which forces the plunger 6 and the mold member 30 into contact with the upper face of the block 47. At the same time fluid is also passed through the pipe 12 and between the piston 27 and the end of the cylinder 23 as shown more particularly in Fig. 2, which forces the plunger up into the cylinder 22. As will be understood from Fig. 2, the hopper 20 is filled with an amount of plastic material and water and, due to the aperture 43 in the cylinder 22, the water fills the said cylinder to the level in the hopper and part of the plastic material moves in through the aperture 43 onto the face 49 of the plunger 21. As the plunger begins to rise and enter the closed portion of the cylinder 22 due to the pressure between the end of the cylinder 23 and piston 27 a pressure is produced on the water within the cylinder between the plunger 21 and the mold.

In operation of my device the pressure is exerted on the liquid by the plunger 21 and the interstices in the several part mold provide for a leakage of the liquid and the plastic material being heavier than the liquid is retained in the mold. As the plunger continues to be forced up through the cylinder 22 the liquid continues to be discharged through the interstices between the several parts of the mold until the plunger reaches the extreme upper position at which point the face 49 of the plunger shapes the plastic material on the under side of the mold block 48 and finishes the plastic material to the desired form.

When this has been done, by operation of the handle 53 of the valve 8, the fluid is passed through the pipe 9 and the pressure of the said fluid forces the piston 6 to the position shown in full lines in Fig. 2 and at the same time the fluid is passed through the pipe 11 under pressure and forces the piston 27 and plunger 21 also to the position shown in full lines in Fig. 2. At this time the operator by downward pressure on the foot operated arc 54 of the valve 41, diverts the fluid into the pipes 39 and 35 which force the bowl core and stem core from the mold to the positions indicated in full lines in Fig. 3, at which time the mold may be separated and the pipe be moved therefrom. It will be noted from Fig. 4 that the mold block 48, which is secured at the upper end of the cylinder 22 is provided with hinges 87 and 88 by which the two parts of the mold block 47 are hinged thereto and the mold block 47 being of greater thickness than the mold block 48, carries the molded article when swung away from the mold block 48. To remove the molded article, which is in this case a pipe, the mold block 47 is swung upward on the hinges 87 and 88 whereupon the two parts of the mold block 47 may be swung outwardly and away from each other on the pivots or bolts 64 and 65, whereupon the pipe may be removed by the operator. By again assembling the parts of the mold the operation may continue as heretofore described. By changing the cores 34 and 37 and changing the shape of the mold, articles of a multiplicity of different shapes may be formed, the operation being practically the same with any type of article. By this method an article of plastic material may be formed which is of even density throughout and is not of greater density at the edges than at the center.

From the foregoing description it becomes evident that this device accomplishes the objects desired and the articles formed by this method are of even density throughout and therefore much stronger than articles usually found on the market.

Having thus briefly described my invention, its utility and mode of operation, what I claim and desire to secure by Letters Patent of the United States is—

1. The herein described method of forming articles of plastic material which consists in first placing the material in a liquid and then separating a predetermined quantity of the material and liquid and applying intensified pressure thereto while in a mold, the mold being of a character to discharge the liquid when under pressure and to prevent escape of the material.

2. The herein described method of forming articles of plastic material which consists in first placing the material in a liquid, and then applying intensified pressure to the material and liquid while in a mold, the mold being of a character to permit discharge of the liquid when under pressure and to retain the material.

3. In apparatus for forming articles of plastic material comprising a cylinder for containing liquid and plastic material, a several part mold at the upper end thereof, a plunger adapted to be reciprocated in the said cylinder, downward movement of the plunger positioning a predetermined amount of plastic material and liquid in the cylinder, upward movement of the plunger applying pressure to the contents of the cylinder to compress the plastic material and the pressure also discharging the liquid through the interstices in the several part mold thereby carrying the plastic material into the mold, the face of the plunger being shaped to complete the mold form.

4. In apparatus for forming articles of plastic material, a mold, a depending tubular member to which the mold opens at the top, a hopper into which the member extends and a plunger operating through the hopper into the tubular member, the plastic material and liquid being positioned in the hopper, means whereby downward movement of the plunger causes the plastic material and liquid to flow over the plunger and into the tubular member and upward movement of the plunger forces the plastic material and liquid into the mold, the pressure exerted by the plunger discharging the liquid through the interstices of the mold and uniformly compressing the said material.

In testimony whereof, I sign this specification.

JOHN H. MORGAN.